United States Patent
Benveniste

(10) Patent No.: US 7,881,322 B1
(45) Date of Patent: Feb. 1, 2011

(54) POWER-SAVING MECHANISM FOR PERIODIC TRAFFIC STREAMS IN WIRELESS LOCAL-AREA NETWORKS

(75) Inventor: Mathilde Benveniste, South Orange, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1488 days.

(21) Appl. No.: 11/191,487

(22) Filed: Jul. 28, 2005

Related U.S. Application Data

(62) Division of application No. 10/736,768, filed on Dec. 16, 2003.

(60) Provisional application No. 60/433,604, filed on Dec. 16, 2002, provisional application No. 60/497,556, filed on Aug. 26, 2003.

(51) Int. Cl.
*H04L 12/56* (2006.01)

(52) U.S. Cl. .................. 370/414; 370/429; 370/449; 370/462

(58) Field of Classification Search ............... 370/338, 370/449, 318, 346, 342, 414, 429, 462; 455/41.2, 455/355, 574, 343.2
See application file for complete search history.

(56) References Cited

U.S. PATENT DOCUMENTS

| 5,737,330 | A  | * | 4/1998  | Fulthorp et al. ............. 370/346 |
| 5,991,287 | A  | * | 11/1999 | Diepstraten et al. .......... 370/338 |
| 6,674,738 | B1 | * | 1/2004  | Yildiz et al. ................. 370/338 |
| 6,697,337 | B1 | * | 2/2004  | Cafarelli et al. ............. 370/253 |
| 6,791,962 | B2 | * | 9/2004  | Wentink ...................... 370/338 |
| 6,807,159 | B1 | * | 10/2004 | Shorey et al. ................ 370/318 |
| 7,154,876 | B2 | * | 12/2006 | Benveniste ................... 370/342 |
| 7,245,946 | B2 | * | 7/2007  | Liu ............................. 455/574 |
| 7,433,670 | B2 | * | 10/2008 | Benveniste ................ 455/343.2 |
| 7,492,753 | B2 | * | 2/2009  | Smavatkul et al. .......... 370/346 |
| 7,548,531 | B2 | * | 6/2009  | Benveniste ................... 370/338 |
| 7,693,085 | B2 | * | 4/2010  | Benveniste ................... 370/252 |
| 7,693,117 | B2 | * | 4/2010  | Benveniste ................... 370/338 |
| 2002/0075852 | A1 | * | 6/2002 | Preiss .......................... 370/352 |
| 2003/0152083 | A1 | * | 8/2003 | Nagata et al. ............. 370/395.4 |
| 2004/0162024 | A1 | * | 8/2004 | Wentink ..................... 455/41.2 |

(Continued)

FOREIGN PATENT DOCUMENTS

GB 2263182 A * 7/1993

OTHER PUBLICATIONS

UMAV: A Simple Enhancement to the IEEE 802.11 DCF; Daji Qiao and Kang G. Shin; Real-Time Computing Laboratory The University of Michigan; 2002 IEEE.*

(Continued)

*Primary Examiner*—Salman Ahmed
(74) *Attorney, Agent, or Firm*—Chapin IP Law, LLC; David W. Rouille, Esq.

(57) ABSTRACT

A novel method for coordinating the delivery of frames to and the receipt of frames from a power-saving station in a wireless local-area network (LAN) is disclosed. The illustrative embodiment establishes a wake-up schedule for a power-saving station based on a temporal period and temporal offset that reduces the frequency with which multiple stations in a network wake up simultaneously, thereby reducing traffic delays and power consumption. The illustrative embodiment is particularly well-suited to networks with traffic that has delay/jitter quality-of-service (QoS) requirements (i.e., voice calls, videophone calls, etc.).

17 Claims, 7 Drawing Sheets

U.S. PATENT DOCUMENTS

| | | | |
|---|---|---|---|
| 2004/0184475 A1* | 9/2004 | Meier | 370/449 |
| 2005/0003794 A1* | 1/2005 | Liu | 455/355 |
| 2005/0009578 A1* | 1/2005 | Liu | 455/574 |
| 2005/0018624 A1* | 1/2005 | Meier et al. | 370/318 |
| 2005/0025114 A1* | 2/2005 | Ware et al. | 370/346 |
| 2005/0201342 A1* | 9/2005 | Wilkinson et al. | 370/338 |
| 2005/0286454 A1* | 12/2005 | Morimoto et al. | 370/311 |
| 2007/0288994 A1* | 12/2007 | Tang | 726/2 |
| 2008/0026695 A1* | 1/2008 | Choi et al. | 455/41.3 |
| 2008/0026696 A1* | 1/2008 | Choi et al. | 455/41.3 |
| 2008/0130603 A1* | 6/2008 | Wentink et al. | 370/338 |
| 2008/0144558 A1* | 6/2008 | Wentink | 370/311 |
| 2008/0192698 A1* | 8/2008 | Rue | 370/331 |
| 2009/0175283 A1* | 7/2009 | Jan et al. | 370/401 |
| 2009/0196211 A1* | 8/2009 | Wentink | 370/311 |
| 2009/0285167 A1* | 11/2009 | Hirsch et al. | 370/329 |
| 2010/0040033 A1* | 2/2010 | Xhafa et al. | 370/338 |
| 2010/0067423 A1* | 3/2010 | Sun et al. | 370/311 |
| 2010/0067424 A1* | 3/2010 | Sun et al. | 370/311 |
| 2010/0214942 A1* | 8/2010 | Du et al. | 370/252 |

OTHER PUBLICATIONS

Imad AAD; Quality of service in wireless local area networks; Oct. 7, 2002.*

* cited by examiner

POWER-SAVING MECHANISM FOR PERIODIC TRAFFIC STREAMS IN WIRELESS LOCAL-AREA NETWORKS

REFERENCE TO RELATED APPLICATIONS

This application is a divisional of pending U.S. patent application Ser. No. 10/736,768, entitled POWER-SAVING MECHANISM FOR PERIODIC TRAFFIC STREAMS IN WIRELESS LOCAL-AREA NETWORKS, filed on Dec. 16, 2003, which claims the benefit of:

1. U.S. provisional patent application Ser. No. 60/433,604, filed 16 Dec. 2002, entitled "Poll Scheduling and Power Saving,", and
2. U.S. provisional patent application Ser. No. 60/497,556, filed 26 Aug. 2003, entitled "Power-Saving Mechanisms for 802.11 Clients,"

all of which are also incorporated by reference.

FIELD OF THE INVENTION

The present invention relates to telecommunications in general, and, more particularly, to wireless local area networks.

BACKGROUND OF THE INVENTION

FIG. 1 depicts a schematic diagram of an exemplary wireless local-area network (LAN) 100 in the prior art comprising access point 101 and stations 102-1 through 102-N, wherein N is a positive integer, interconnected as shown. Each station 102-$i$, wherein $i$ is a member of the set $\{1, 2, \ldots N\}$, is a device such as a notebook computer, personal digital assistant (PDA), tablet PC, etc. that transmits radio signals to and receives radio signals from other stations in local-area network 100 via access point 101.

Access point 101 and stations 102-1 through 102-N transmit data in units referred to as frames over a shared-communications channel such that if two or more stations (or an access point and a station) transmit frames simultaneously, then one or more of the frames can become corrupted (resulting in a collision). As a result, local-area networks typically employ one or more protocols to ensure that a station or access point can gain exclusive access to the shared-communications channel for an interval of time in order to transmit its frames. Frames transmitted from a station 102-$i$ to access point 101 are referred to as uplink frames, and frames transmitted from access point 101 to a station 102-$i$ are referred to as downlink frames.

In accordance with some protocols (e.g., Institute of Electrical and Electronics Engineers [IEEE] 802.11, etc.), access point 101 periodically broadcasts a special frame called a beacon to all of the stations 102-1 through 102-N. The beacon contains a variety of information that enables stations to establish and maintain communications in an orderly fashion, such as a timestamp, which enables stations to synchronize their local clocks, and signaling information (e.g., channel number, frequency hopping pattern, dwell time, etc.).

A station 102-$i$ can prolong its battery life by powering off its radio when not transmitting or receiving. When a station powers off its radio, the station is said to enter the doze state. A station wakes up from the doze state by powering on its radio to enter the alert state. While a station is in the doze state, it cannot transmit or receive signals, and is said to be asleep. A station that saves battery life by alternating between alert to doze states is said to be in power-save mode, and a station that employs power-save mode is said to be a power-saving station.

While a station 102-$i$ is asleep, access point 101 buffers any downlink frames for station 102-$i$ for eventual delivery when station 102-$i$ wakes up. Three issues therefore arise when a station 102-$i$ is in power-save mode:

(1) When should station 102-$i$ wake up?
(2) How will access point 101 know that station 102-$i$ has awakened?
(3) How long does station 102-$i$ stay awake?

One strategy, which is used in the IEEE 802.11-1999 standard, is for the access point 101 to include periodically in the beacon a Traffic Indication Map (TIM) that identifies which stations in power-save mode have downlink frames waiting for them in access point 101's buffer. When a station wakes up and the TIM indicates that there are frames buffered at access point 101 for the station, the station sends a a Power Save (PS) poll frame to access point 101 to request delivery of a buffered frame, and, after receiving and acknowledging the downlink frame, goes back to the doze state. A separate PS poll frame must be transmitted for each downlink frame buffered at access point 101.

In another strategy, known as Automatic Power-Save Delivery (APSD), the delivery of downlink buffered frames can occur automatically—that is, without special signaling frames to notify access point 101 that a station is awake and ready to receive frames.

Another feature of APSD relates to the termination of the awake period, the time interval a power-saving station must remain awake. A power-saving station may stay awake to receive several buffered frames, and goes to back to sleep when it is notified by access point 101.

There are different variations of APSD possible, which differ with respect to when delivery takes place and signaling for the end of a awake period[0001]. With the variation that has come to be known as beacon-based APSD, access point 101 periodically includes a Traffic Indication Map in the beacon to identify which stations in power-save mode have downlink frames waiting for them in the access point 101's buffer, as in the 802.11d4.0-1999 power-save method. After transmitting a beacon with a TIM, access point 101 transmits its buffered downlink frames.

In accordance with beacon-based APSD, stations in the doze state wake up to receive beacons and check the TIM. If the TIM indicates that there are no buffered downlink frames for a station 102-$i$, then station 102-$i$ immediately goes back into the doze state; otherwise, station 102-$i$ stays awake to receive the buffered downlink frames from access point 101, and then goes back into power-save mode. In addition, a station in the doze state buffers uplink frames generated by the application layer, and transmits one or more of the buffered uplink frames upon wake-up. Prior to entering power-save mode, a station sends a message to access point 101 that specifies a beacon period for subsequent wake-up (e.g., wake-up every 10 beacons, etc.) and an offset (i.e., phase), thereby identifying the beacons at which the station will wake up. The awake period is terminated by access point 101's notifying the station (e.g., via specially designated bits in the control field(s) of a frame, etc.) that there are no more frames buffered at the access point awaiting transmission.

SUMMARY OF THE INVENTION

The present invention is based on the identification of three drawbacks of the Automatic Power-Save Delivery mechanism. The Automatic Power-Save Delivery mechanism is ill-suited for traffic with delay/jitter quality-of-service (QoS) requirements (i.e., voice calls, videophone calls, etc.) because wake-up periods based on multiples of beacon intervals are too large for the inter-frame arrival times required for adequate call quality. Finally, it is possible for a power-saving station to waste battery life waiting for the last of its buffered frames to be received before it can go back to sleep if low priority downlink traffic is transmitted after higher priority frames destined for other stations, which would be expected in a local-area network that supports QoS.

In order to overcome these drawbacks, in the illustrative embodiment of the present invention, a station, prior to entering power-save mode, sends a request to access point 101 that specifies a desired temporal period for subsequent wake-up that is independent of beacons. Access point 101 determines, based on existing transmission schedules (e.g., polling schedules, wake-up schedules, etc.), whether to accept or reject the request. If access point 101 accepts the request, then access point 101 determines, based on existing polling and wake-up schedules, a temporal offset that will reduce the occurrence of concurrent wake-ups, and sends a positive notice with the temporal offset to the station. If access point 101 rejects the request, then access point 101 sends a negative notice to the station denying the request.

In the illustrative embodiment, a station might optionally send to access point 101, in addition to the desired temporal period, a suggested temporal offset. Access point 101 can either decide to use the suggested temporal offset if it will result in a sufficiently low rate of collisions (e.g., concurrent wake-ups, etc.) or access point 101 can select a new temporal offset accordingly.

In the illustrative embodiment, a power-saving station can go back to sleep when it receives a frame with an end-of-awake-period control field that is enabled. The awake period can be terminated while there is traffic still buffered at access point 101. This enables access point 101 to manage its downlink transmissions according to the priority of traffic at the access point without forcing power-saving stations to stay awake until all traffic buffered for them has been transmitted.

For the purposes of this specification, the term "temporal offset" is used to indicate either (i) a relative value (i.e., phase) with respect to a temporal period, or an absolute starting time (i.e., the time at which a periodic sequence starts).

The illustrative embodiment of the present invention is advantageous for aperiodic traffic (e.g., bursty, random, etc.) as well as periodic traffic (e.g., call traffic, etc.).

The illustrative embodiment comprises: (a) receiving a temporal period associated with a wake-up schedule for a device that has a power-save mode; (b) determining, based on one or more existing transmission schedules, whether the temporal period can be accommodated; and (c) when the temporal period can be accommodated, (i) determining a temporal offset for the wake-up schedule, and (ii) transmitting to the device a positive notice comprising the temporal offset. In some embodiments an end-of-awake-period indication may be transmitted.

DETAILED DESCRIPTION

Figure 1:
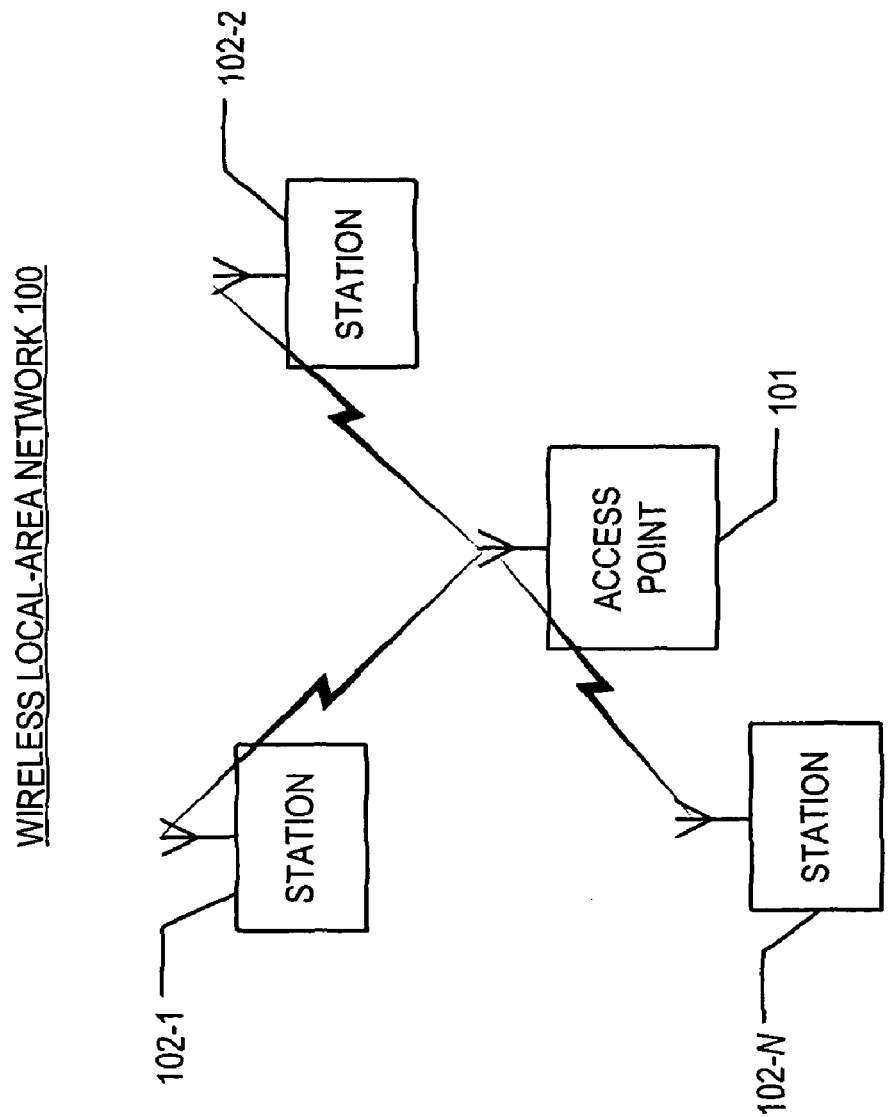
FIG. 1 depicts a schematic diagram of an exemplary wireless local-area network 100 in the prior art.
Figure 2:
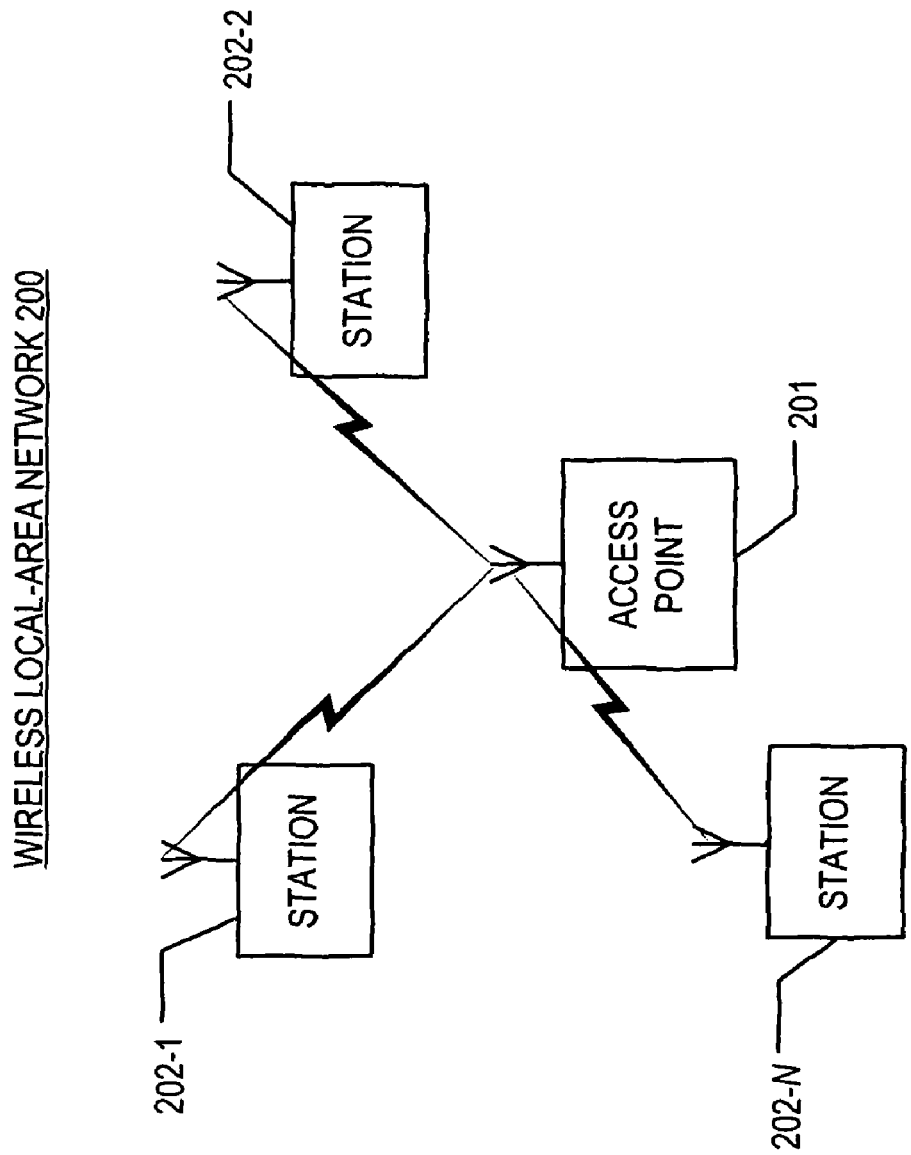
FIG. 2 depicts a schematic diagram of a portion of local-area network 200 in accordance with the illustrative embodiment of the present invention.

FIG. 2 depicts a schematic diagram of local-area network 200 in accordance with the illustrative embodiment of the present invention. Local-area network 200 comprises access point 201, and stations 202-1 through 202-N, wherein i is a positive integer in the set $\{1, \ldots N\}$, interconnected as shown.

Station 202-i is capable of (i) generating frames, (ii) transmitting frames over a shared-communications channel to access point 201, and (iii) receiving frames from the shared-communications channel. In some embodiments, station 202-i might also able to communicate in peer-to-peer fashion (i.e., transmitting to and receiving frames from other stations directly instead of via access point 201). Station 202-i is capable of entering power-save mode and of receiving and transmitting frames while in power-save mode as described below and with respect to FIG. 6.

Access point 201 is capable of receiving frames from and transmitting frames to stations 202-1 through 202-N via a shared-communications channel. Access point 201 is also capable of buffering downlink frames for a power-saving station in doze state, and of delivering buffered downlink frames to power-saving stations as described below and with respect to FIG. 5.

Figure 3:
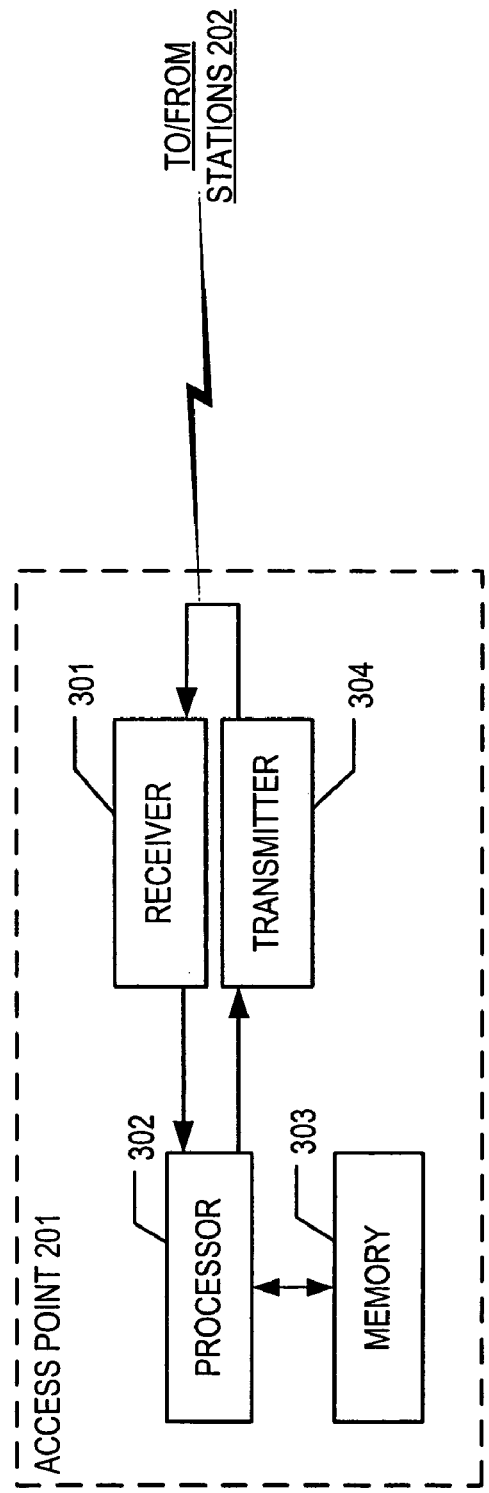
FIG. 3 depicts a block diagram of the salient components of access point 201, as shown in FIG. 2, in accordance with the illustrative embodiment of the present invention.

FIG. 3 depicts a block diagram of the salient components of access point 201 in accordance with the illustrative embodiment of the present invention. Access point 201 comprises receiver 301, processor 302, memory 303, and transmitter 304, interconnected as shown.

Receiver 301 is a circuit that is capable of receiving frames from shared communications channel 203, in well-known fashion, and of forwarding them to processor 302. It will be clear to those skilled in the art how to make and use receiver 301.

Processor 302 is a general-purpose processor that is capable of executing instructions stored in memory 303, of reading data from and writing data into memory 303, and of executing the tasks described below and with respect to FIG. 5. In some alternative embodiments of the present invention, processor 302 might be a special-purpose processor (e.g., a network processor, etc.). In either case, it will be clear to those skilled in the art, after reading this disclosure, how to make and use processor 302.

Memory 303 is capable of storing programs and data used by processor 302, as is well-known in the art, and might be any combination of random-access memory (RAM), flash memory, disk drive, etc. It will be clear to those skilled in the art, after reading this specification, how to make and use memory 303.

Transmitter 304 is a circuit that is capable of receiving frames from processor 302, in well-known fashion, and of transmitting them on shared communications channel 203. It will be clear to those skilled in the art how to make and use transmitter 304.

Figure 4:
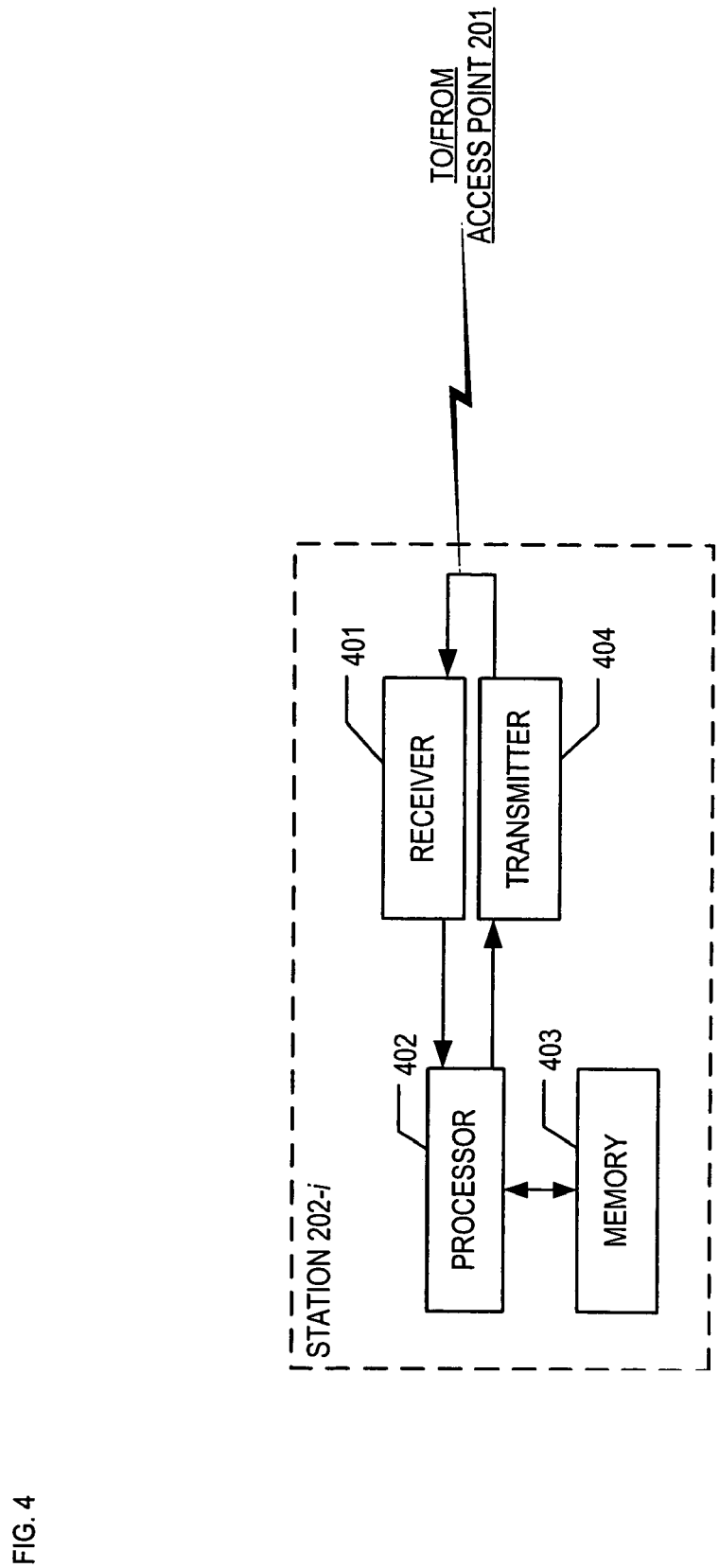
FIG. 4 depicts a block diagram of the salient components of station 202-i, as shown in FIG. 2, in accordance with the illustrative embodiment of the present invention.

FIG. 4 depicts a block diagram of the salient components of station 202-$i$, in accordance with the illustrative embodiment of the present invention. Station 202-$i$ comprises receiver 401, processor 402, memory 403, and transmitter 404, interconnected as shown.

Receiver 401 is a circuit that is capable of receiving frames from shared-communications channel 203, in well-known fashion, and of forwarding them to processor 402. Receiver 401 is also capable of being powered off for a doze state. It will be clear to those skilled in the art how to make and use receiver 401.

Processor 402 is a general-purpose processor that is capable of executing instructions stored in memory 403, of reading data from and writing data into memory 403, of instructing receiver 401 and transmitter 404 to power off, and of executing the tasks described below and with respect to FIG. 6. In some alternative embodiments of the present invention, processor 402 is a special-purpose processor (e.g., a network processor, etc.). In either case, it will be clear to those skilled in the art, after reading this disclosure, how to make and use processor 402.

Memory 403 is capable of storing programs and data used by processor 402, as is well-known in the art, and might be any combination of random-access memory (RAM), flash memory, disk drive, etc. It will be clear to those skilled in the art, after reading this specification, how to make and use memory 403.

Transmitter 404 is a circuit that is capable of receiving frames from processor 402, in well-known fashion, and of transmitting them on shared communications channel 203. Transmitter 404 is also capable of being powered off for a doze state. It will be clear to those skilled in the art how to make and use transmitter 404.

In the illustrative embodiment of the present invention, access point 201 and stations 202-1 through 202-N support at least one IEEE 802.11 protocol. In alternative embodiments of the present invention, access point 201 and stations 202-1 through 202-N might support other protocols in lieu of, or in addition to, one or more IEEE 802.11 protocols. Furthermore, in some embodiments of the present invention local-area network 200 might comprise an alternative shared-communications channel (for example, wireline instead of wireless). In all such cases, it will be clear to those skilled in the art after reading this specification how to make and use access point 201 and stations 202-1 through 202-N.

Figure 5:
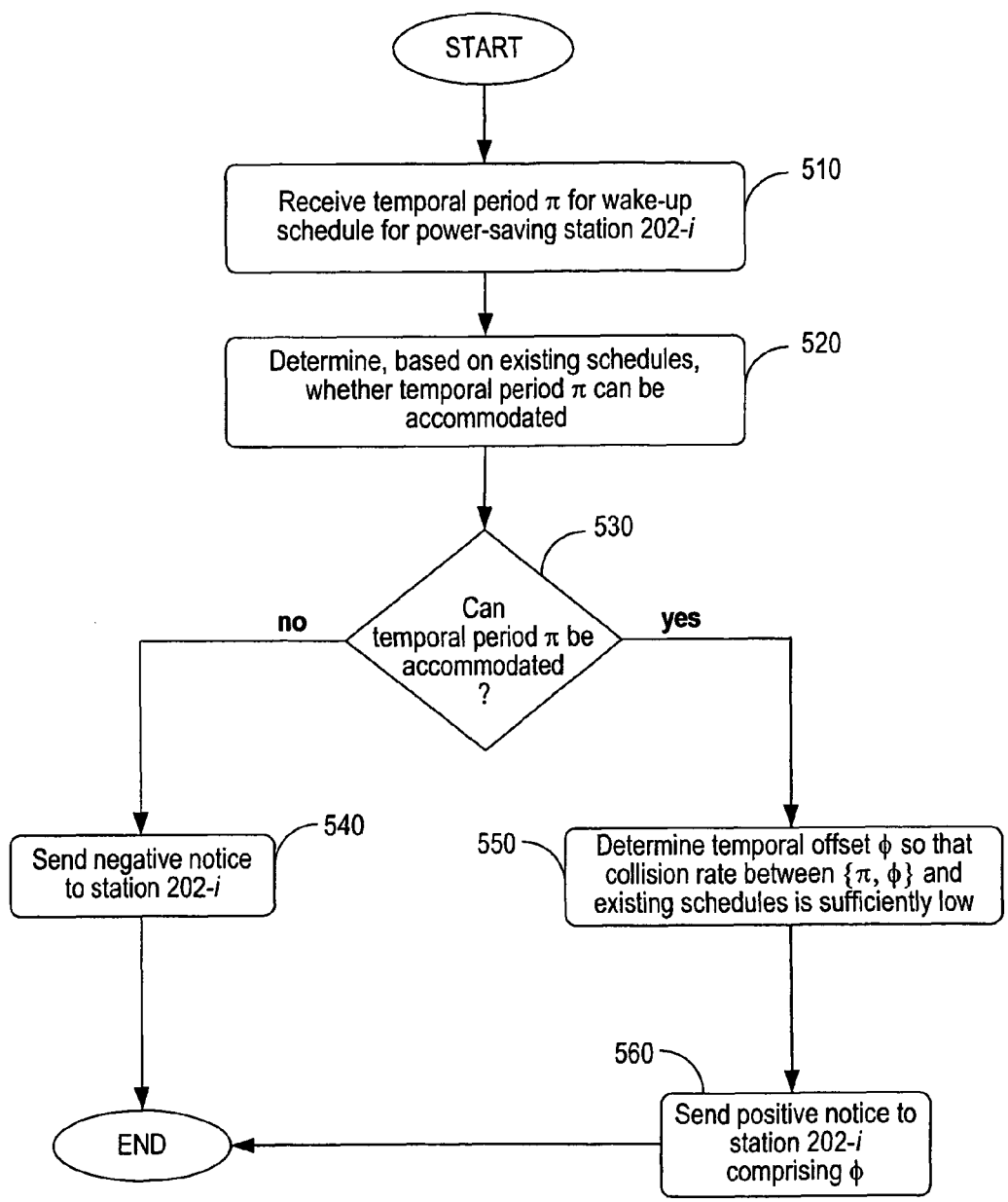
FIG. 5 depicts a flowchart for access point 201, as shown in FIG. 2, for a first method of establishing a wake-up schedule for a power-saving station in accordance with the illustrative embodiment of the present invention.

FIG. 5 depicts a flowchart for access point 201 for a first method of establishing a wake-up schedule for a power-saving station, in accordance with the illustrative embodiment of the present invention. It will be clear to those skilled in the art which tasks depicted in FIG. 5 can be performed simultaneously or in a different order than that depicted.

At task 510, access point 201 receives a temporal period □ for a desired wake-up schedule for power-saving station 202-$i$, in well-known fashion. As will be appreciated by those skilled in the art, in some embodiments temporal period □ might be embedded in a message that contains other kinds of information (e.g., a traffic specification [TSPEC] message in an IEEE 802.11e network, etc.), while in some other embodiments, temporal period □ might be sent via a special-purpose message. In the former case, the message might also contain a field that indicates that station 202-$i$ is in power-save mode, while in the latter case, this is implicitly indicated by the special-purpose message.

At task 520, access point 201 determines, based on existing schedules (e.g., wake-up schedules for other power-saving stations, polling schedules, etc.), whether temporal period □ can be accommodated (i.e., whether the shared-communications channel can handle the additional "load" of the desired wake-up schedule without the rate of collisions exceeding a particular threshold □.)

Task 530 is a branch statement based on the result of task 520; if a new wake-up schedule with temporal period □ cannot be accommodated, execution proceeds to task 540, otherwise execution continues at task 550.

At task 540, access point 201 sends a negative notice frame to station 202-$i$ that indicates that the desired wake-up schedule cannot be accommodated. In some embodiments, the negative notice might indicate that no additional load can be accommodated by access point 201, while in some other embodiments, the negative notice might indicate that station 202-$i$ might try an alternative method of power-saving, while in still some other embodiments, the negative notice might indicate a suggested alternative method of power-saving. After completion of task 540, the method of FIG. 5 terminates.

At task 550, access point 201 determines a value for temporal offset □ that will keep the rate of collisions between the new wake-up schedule and existing schedules below threshold □. In some cases, access point 201 might also need to make adjustments to one or more of the existing schedules in order to keep the rate of collisions below threshold □.

At task 560, access point 201 sends a positive notice frame to station 202-$i$ that indicates the temporal offset □ for station 202-$i$'s wake-up schedule. After completion of task 560, the method of FIG. 5 terminates.

After completion of FIG. 5, access point 201 buffers downlink frames for station 202-$i$ and automatically transmits buffered frames in accordance with station 202-$i$'s wake-up schedule. Access point 201 can either transmit all of the buffered frames to station 202-$i$, or can transmit a portion of the frames and indicate the end of the transmission by enabling an end-of-awake period control field in the last frame. This provides access point 201 with the flexibility to manage its downlink transmissions (e.g., according to traffic class priorities, etc.) without forcing station 202-$i$ to stay awake until all its buffered frames are received.

As will be appreciated by those skilled in the art, although FIG. 5 is disclosed as a method to be performed by access point 201, in some embodiments in which local-area network 200 (i) has one or more non-power-saving stations in addition to power-saving station 202-$i$, and (ii) supports peer-to-peer communications, FIG. 5 might be performed either by one of the non-power-saving stations, or by power-saving station 202-$i$ itself, instead of access point 201. In the latter case, the communications-oriented tasks of FIG. 5 (510, 540, and 560) need not be performed by station 202-$i$.

Figure 6:
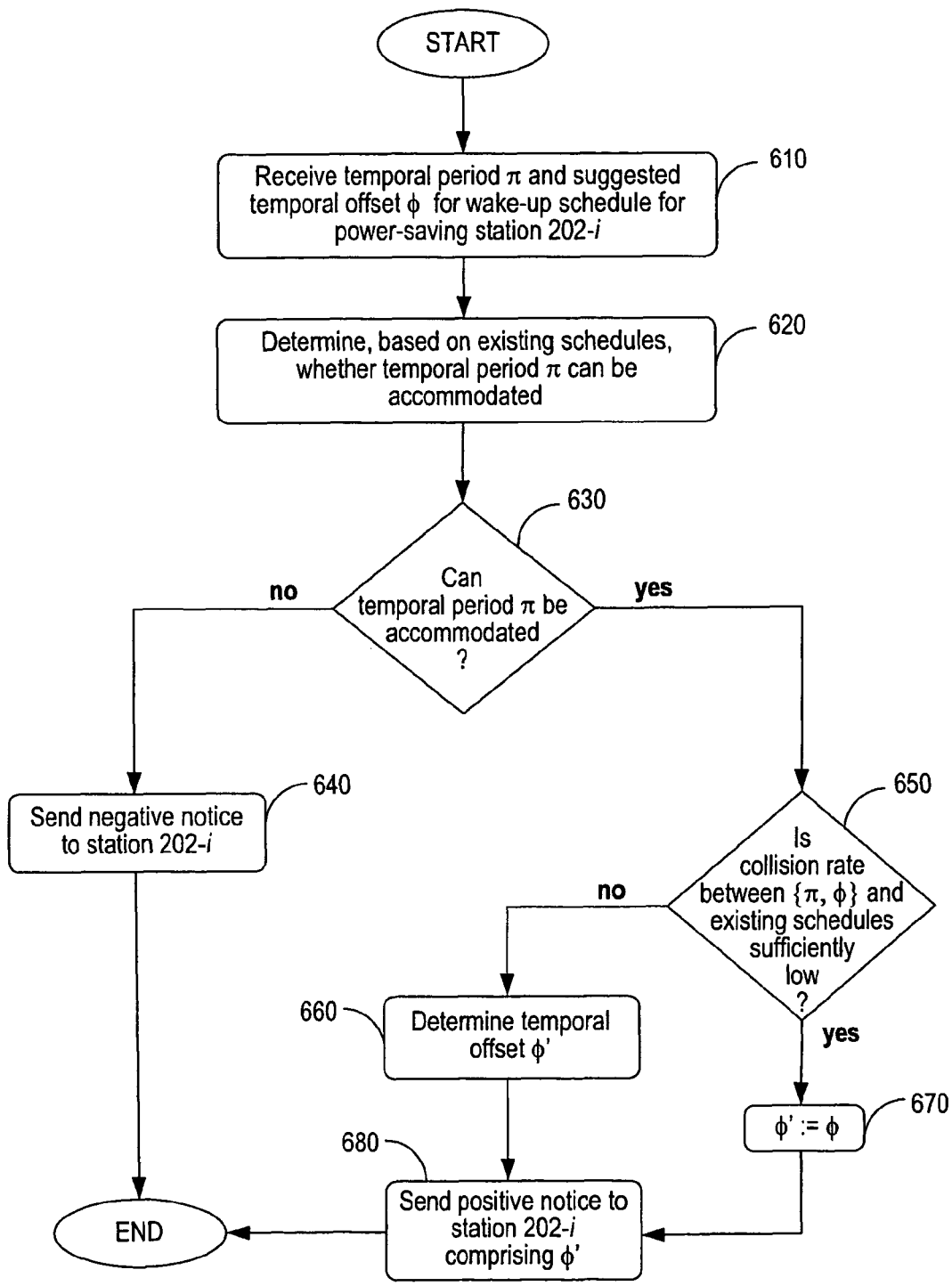
FIG. 6 depicts a flowchart for access point 201, as shown in FIG. 2, for a second method of establishing a wake-up schedule for a power-saving station in accordance with the illustrative embodiment of the present invention.

FIG. 6 depicts a flowchart for access point 201 for a second method of establishing a wake-up schedule for a power-saving station, in accordance with the illustrative embodiment of the present invention. It will be clear to those skilled in the art which tasks depicted in FIG. 6 can be performed simultaneously or in a different order than that depicted.

At task 610, access point 201 receives a temporal period □ and a suggested temporal offset □ for a desired wake-up schedule for power-saving station 202-$i$, in well-known fashion. As will be appreciated by those skilled in the art, in some embodiments temporal period □ and offset □ might be embedded in a message that contains other kinds of information (e.g., a traffic specification [TSPEC] message in an IEEE 802.11e network, etc.), while in some other embodiments, temporal period ☐ and offset ☐ might be sent via a special-purpose message. In the former case, the message might also contain a field that indicates that station 202-*i* is in power-save mode, while in the latter case, this is implicitly indicated by the special-purpose message.

At task 620, access point 201 determines, based on existing schedules (e.g., wake-up schedules for other power-saving stations, polling schedules, etc.), whether temporal period ☐ can be accommodated (i.e., whether the shared-communications channel can handle the additional "load" of the desired wake-up schedule without the rate of collisions exceeding a particular threshold ☐.) This determination is made independent of the suggested temporal offset ☐.

Task 630 is a branch statement based on the result of task 620; if a new wake-up schedule with temporal period ☐ cannot be accommodated, execution proceeds to task 640, otherwise execution continues at task 650.

At task 640, access point 201 sends a negative notice frame to station 202-*i* that indicates that the desired wake-up schedule cannot be accommodated. In some embodiments, the negative notice might indicate that no additional load can be accommodated by access point 201, while in some other embodiments, the negative notice might indicate that station 202-*i* might try an alternative method of power-saving, while in still some other embodiments, the negative notice might indicate a suggested alternative method of power-saving. After completion of task 640, the method of FIG. 6 terminates.

At task 650, access point 201 determines whether the suggested temporal offset ☐ will keep the rate of collisions between the new wake-up schedule and existing schedules below threshold ☐. If not, execution proceeds to task 660, otherwise execution continues at task 670.

At task 660, access point 201 determines a temporal offset ☐' that will keep the rate of collisions between the new wake-up schedule and existing schedules below threshold ☐. After completion of task 660, execution continues at task 680.

At task 670, access point 201 sets temporal offset ☐' to the same value as suggested temporal offset ☐.

At task 680, access point 201 sends a positive notice frame to station 202-*i* that indicates the temporal offset ☐' for station 202-*i*'s wake-up schedule. After completion of task 680, the method of FIG. 6 terminates.

After completion of FIG. 5, access point 201 buffers downlink frames for station 202-*i* and automatically transmits buffered frames in accordance with station 202-*i*'s wake-up schedule. Access point 201 can either transmit all of the buffered frames to station 202-*i*, or can transmit a portion of the frames and indicate the end of the transmission by enabling an end-of-awake-period control field in the last frame. This provides access point 201 with the flexibility to manage its downlink transmissions (e.g., according to traffic class priorities, etc.) without forcing station 202-*i* to stay awake until all its buffered frames are received.

As will be appreciated by those skilled in the art, although FIG. 6 is disclosed as a method to be performed by access point 201, in some embodiments in which local-area network 200 (i) has one or more non-power-saving stations in addition to power-saving station 202-*i*, and (ii) supports peer-to-peer communications, FIG. 6 might be performed either by one of the non-power-saving stations, or by power-saving station 202-*i* itself, instead of access point 201. In the latter case, the communications-oriented tasks of FIG. 6 (610, 640, and 680) need not be performed by station 202-*i*.

Figure 7:
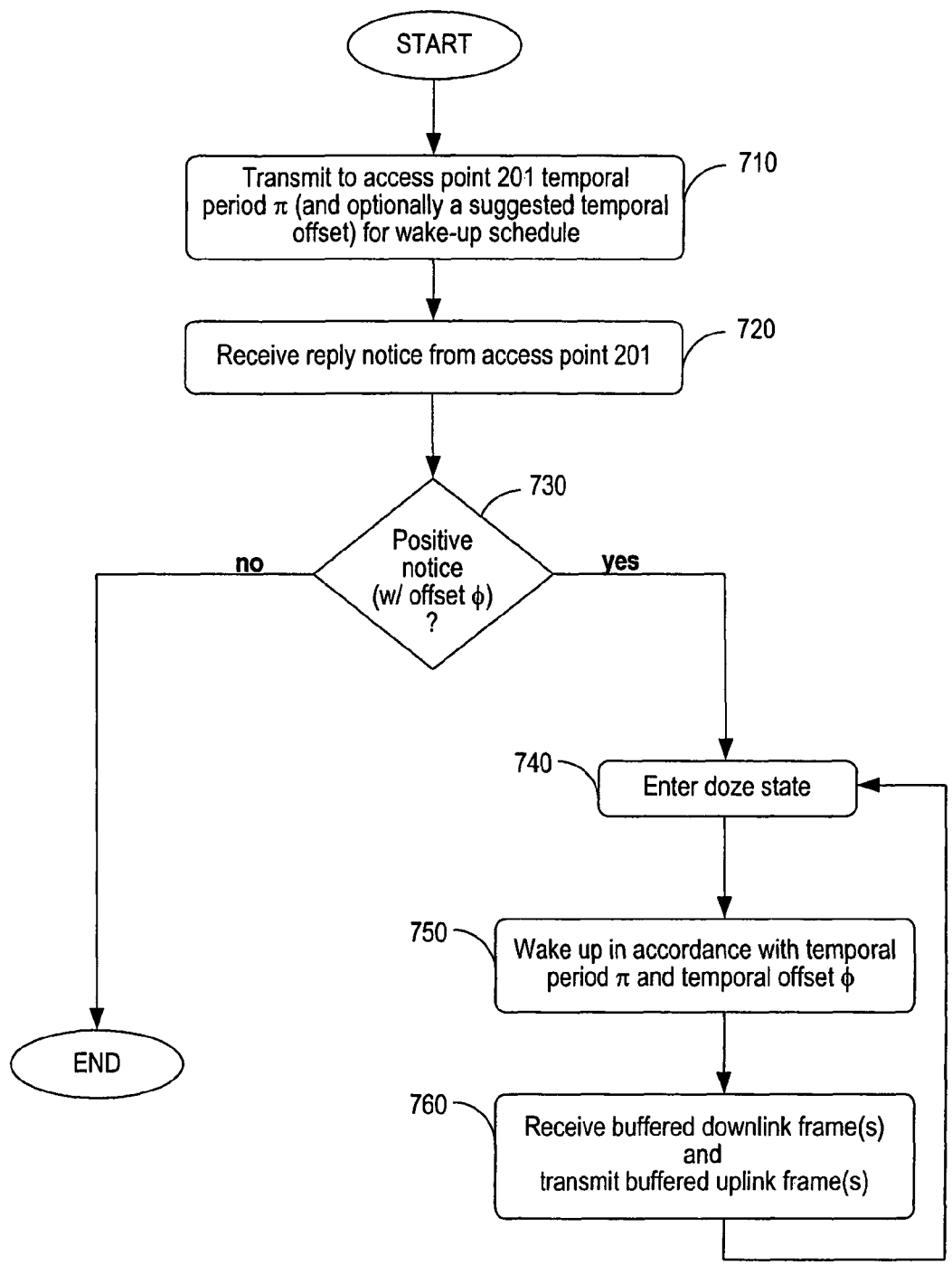
FIG. 7 depicts a flowchart for station 202-i, as shown in FIG. 2, for entering and operating in power-saving mode, in accordance with the illustrative embodiment of the present invention.

FIG. 7 depicts a flowchart for station 202-*i* for entering and operating in power-saving mode, in accordance with the illustrative embodiment of the present invention.

At task 710, station 202-*i* transmits to access point 201, in well-known fashion, a temporal period ☐, and optionally, a suggested temporal offset, for its desired wake-up schedule. As will be appreciated by those skilled in the art, in some embodiments temporal period ☐ and suggested offset ☐ might be embedded in a message that contains other kinds of information (e.g., a traffic specification [TSPEC] message in an IEEE 802.11e network, etc.), while in some other embodiments, temporal period ☐ and suggested offset ☐ might be sent via a special-purpose message. In the former case, the message might also contain a field that indicates that station 202-*i* is in power-save mode, while in the latter case, this is implicitly indicated by the special-purpose message. As will further be appreciated by those skilled in the art, in some embodiments in which local-area network 200 supports peer-to-peer communications, station 202-*i* might transmit ☐ and ☐ to a non-power-saving station.

At task 720, station 202-*i* receives a reply notice from access point 201, in well-known fashion. As will be appreciated by those skilled in the art, in some embodiments station 202-*i* might receive the reply notice from a non-power-saving station.

At task 730, station 202-*i* checks whether the reply notice received at task 720 is a positive notice comprising a temporal offset ☐ or a negative notice. If it is a negative notice, the method of FIG. 7 terminates, otherwise execution continues at task 740.

At task 740, station 202-*i* enters a doze state.

At task 750, station 202-*i* wakes up in accordance with temporal period ☐ and temporal offset ☐

At task 760, station 202-*i* receives one or more downlink frames and transmits one or more buffered uplink frames, in well-known fashion. As will be appreciated by those skilled in the art, in the case of contention-based access to the shared-communications channel (e.g., the Distributed Coordination Function [DCF] in IEEE 802.11b, the Extended Distributed Coordination Function [EDCF] in IEEE 802.11e, etc.), access point 201, having the highest-priority access to the channel, first transmits the buffered downlink frames to station, 202-*i*, and then station 202-*i*, after gaining access to the channel, transmits its buffered uplink frames to access point 201. In order to achieve greater power-save performance for power-saving stations that employ a contention-based access mechanism, access point 101 refrains from transmitting following its transmission to station 202-*i*, for a period of time sufficiently long to enable a power-saving station to gain access to the channel.

As will be appreciated by those skilled in the art, in the case of contention-free access to the shared-communications channel (e.g., the Polling Coordination Function [PCF] in IEEE 802.11b, the Hybrid Coordination Function [HCF] in IEEE 802.11e, etc.), transmission of downlink and uplink frames occurs in interleaved fashion. As described above, station 202-*i* stays awake to receive downlink frames until either an end-of-awake-period frame or a conventional end-of-sequence frame is received. After completion of task 760, execution continues back at task 740.

As will be appreciated by those skilled in the art, in some embodiments in which local-area network 200 supports peer-to-peer communications and has one or more non-power-saving stations in addition to power-saving station 202-*i*, the communications-oriented tasks of FIG. 7 (710, 720, and 760) (i) might be performed with respect to one of the non-power-saving stations instead of access point 201, or (ii) might not be performed at all when power-saving station 202-*i* itself performs the methods of FIGS. 5 and 6, as described above.

An 802.11 station can prolong its battery life by powering off its radio when not transmitting or receiving. The efficiency of the protocol determining when a station should wake up in order to send and/or receive transmissions destined to it will depend on the type of traffic involved. The traffic may be periodic in one or both directions, and have different priorities. The 802.11e draft standard provides two mechanisms for power-saving delivery: The Power Management mechanism in the 802.11-1999 standard, referred to here as the 'legacy' mechanism, and the APSD (Automatic Power Saving Delivery) mechanism. The latter, which has subsequently come to be known as "Scheduled APSD", is designed to improve QoS performance by taking advantage of the periodic nature of VoIP and other synchronous downlink streams. The legacy mechanism can also be used for VoIP calls, but less effectively. The two mechanisms can be combined and used for bi-directional periodic streams.

While operating under legacy power management, a station can have its downlink traffic buffered when it is asleep. The station requests buffering of its traffic by setting the power management bit to 1 in the frame control field of a frame transmitted uplink. When the station wakes up, the station can receive its frames by indicating that it is awake. This can be done in two ways: the first way is by setting the power management bit to 0 in the frame control field of its frames uplink, and the second way is by sending a PS (power saving) poll to request the transmission of a single frame.

When the first method is used, the AP notifies the station when the all buffered frames have been transmitted and the buffer is empty by setting the More Data bit in the last frame transmitted to a station to 0. If the station has no more uplink frames to send, it can go back to sleep after acknowledgement has been sent for the last buffered frame. If more frames are pending uplink transmission, the station can stay awake to transmit these frames, and will go to sleep, provided the acknowledgements received from the AP continue to indicate that there are no frames buffered. When the station goes back to sleep, it can set the power management bit to 1 in the frame control field of either the ACK to the last downlink frame received, or in the frame control field of the last uplink frame sent. All retransmissions of frames lost or received with errors will occur during the time interval when the power-saving bit is 0.

The legacy power saving mechanism can be combined with new features of the 802.11e draft standard to yield a more efficient power saving mechanism. Specifically, the new QoS frame format allows the AP to indicate whether a QoS frame is the last frame to be transmitted in the present wake-up period by setting the Last bit in the QoS control field. This flag is different from the More Data bit in the frame control field, used to signal that there are more frames buffered at the AP for the destination station. The capability to indicate both is useful when the AP must postpone certain downlink transmissions in order to meet QoS requirements. A station that goes to sleep having received a downlink frame with both the Last bit set to 1 and the More Data bit set to 1 may send a null frame with Power Management bit set to 0 to receive the remaining buffered frames at a later time.

A power-saving station can find out whether there is buffered traffic at the AP by reading the beacon TIM, which indicates so. If, however, a station has a reason to wake up and transmit uplink frequently (that is, at time interval shorter than the beacon period), there is no need to wake up in order to listen to the beacon TIM. The More Data bit in the acknowledgement lets the station know of its buffered frames pending transmission.

An example of this arises during a VoIP call. In general, a station capable of VoIP calling is typically in one of two modes: Stand-by mode or Active mode. In the stand-by mode the station is powered on but does not engage in calling. A station in stand-by mode may receive or send signaling traffic during the initiation of a call. In the active mode the station is engaged in a call, or equivalently, generates and receives traffic periodically. A station exchanging traffic with the AP that is not symmetric can operate as in stand-by VoIP mode. A station sending periodic traffic streams uplink without receiving a periodic downlink stream can operate as in the VoIP active mode, provided that the delay tolerance for downlink frames is not less than the interarrival time of the periodic uplink stream. The 'legacy' power saving mechanism in 802.11-1999 can be used for both modes.

If silences are not suppressed during a VoIP call, there will be frames generated periodically along both directions, uplink and downlink. In that case, the station wakes up to transmit its uplink frames. Having been notified of the existence of buffered downlink frames by the More Data bit in the acknowledgement frame, the station stays awake to receive its buffered frames.

With silence suppression at the station, there are two possible modes of operation. The station may wake up periodically and transmit null frames. Acknowledgement of uplink frames indicate whether downlink frames are pending transmission, and hence the station stays awake to receive its buffered frames, as described above. Alternatively, the station may listen to the beacon TIM to ascertain the same. The advantage of the second method is that less power is used if the downlink side were silent, too. If the downlink side is sending frames, it is preferable to send a null frame at the service period, as less power would be used. The station will have omitted powering on for the TIM. Preferably, the two approaches are combined.

The station does not wake up for the beacon TIM if there is periodic uplink data with period less than or equal to the tolerance for downlink delay. If the station has no uplink data for at least a service interval (period of the stream), the station wakes up to listen to the TIM. The station will continue to do so until either uplink or downlink data arrives. If the TIM indicates downlink data buffered at the AP for the station, and if the station continues to have no uplink data, the station starts waking up at the service interval and sends null frames uplink, in order to signal that it is awake and ready to receive downlink data. If uplink data is generated, the station will send the uplink frame instead of the null frame.

The logic of station operation under the Legacy power-saving rules is outlined below. It is assumed that the downlink service interval specified is shorter than the TIM beacon interval.

The station will go to sleep and wake up to listen to the beacon TIM periodically to check whether there is buffered traffic, unless there is periodic uplink traffic generated by the station with a shorter service interval than the TIM beacon interval. If buffered traffic is indicated, the station will send a null frame with the Power Management bit set to 0 in the frame control field, signaling to the AP that it is awake. If no buffered traffic is indicated, the station will repeat waking up to listen to the beacon TIM at the next beacon interval.

If uplink traffic is generated periodically with a shorter period than the TIM beacon interval, the station will wake up and send uplink frame(s) as they arrive. An uplink frame with the Power Management bit set to 0 in the frame control field will signal the AP that the power-saving station is awake.

The station will stay awake until it has transmitted its uplink frames and has received notice from the AP that either there are no buffered frames pending transmission, or downlink transmission of buffered frames is postponed. A downlink frame with the More Data bit set to 0 in the frame control field, will signal that there are no more downlink frames pending transmission. A downlink frame with the Last bit set to 1 in the QoS control field, signals that the AP will not transmit more downlink frames during this wake-up period.

Having received a downlink frame with either the More Data bit set to 0 or the Last bit "ON", a station shall indicate in its last frame that it is going back to sleep. The last frame will be either the last uplink MSDU or an ACK to the last downlink frame. If the last uplink transmission is an uplink MSDU, the station will stay awake until the expiration of the NAV or until it receives an ACK, whichever occurs first. If an ACK is not received, it will retransmit the frame.

If the last frame is an ACK to a downlink frame, the station will stay awake until it receives another transmission starting at PIFS following ACK timeout. If no such transmission occurs the station can go to sleep. If the transmission is not directed to itself, the station can go to sleep. Otherwise the station will acknowledge receipt of the frame and stay awake until it receives another transmission starting at PIFS following ACK timeout. This feature is used to safeguard against repeated retransmissions by the AP. It avoids unanswered retransmissions when the ACK to the last downlink frame is missed and the station has gone to sleep.

A station that goes to sleep having received a downlink frame with the Last bit set to 1 and the More Data bit set to 1 may subsequently send a null frame with Power Management bit set to 0 to receive the remaining buffered frames.

During AP 'Legacy' operation, the AP sends frames buffered for a power saving station as soon as the station wakes up. That is indicated when a frame is received from that station with the Power Management bit set to 0 in the frame control field. Downlink data is piggybacked with any pending ACKs to uplink data from the station. If there is no frame to send in a cycle, it sends nothing.

Receipt of a frame with the Power Management bit set to 1 in the frame control field indicates that the station sending the frame is in sleep mode. The AP buffers the frames destined to a station in power saving mode. The More Data bit in the frame control field is set to 1 for all buffered frames except the last, in which the same is set to 0.

The Last bit in the QoS control field is set to 0 for all downlink frames sent to a station until the AP determines that other downlink transmissions have precedence, in which case the AP sends downlink frames with the Last bit set to 1. If the AP that receives an uplink frame from a station for which it has no buffered data, it will set the More Data bit to 0 in the ACK sent to that station.

In order to accomplish QoS Prioritization under 'Legacy' Power Management, requirements, separate EDCF buffers are used to store frames by their priority at the station. Buffers are emptied using the rules of EDCF contention. To preserve battery life, a station may wake up either when delay-sensitive traffic (high priority EDCF traffic) arrives at its buffer, or after the uplink frames have reached a specified age, at which point the station will transmit uplink frames with the same TXOP. The station will stay awake to receive the frames that are buffered at the AP. If all the frames are not sent by the AP while the station wakes up for transmission of uplink frames, the station will wake up subsequent to being notified that there are downlink frames remaining buffered at the AP in order to receive these frames. All priority queues at the station will contend while the station is awake. Channel contention for uplink transmission may be interrupted and the station may go to sleep in order to avoid a long contention period and heavy battery drain.

The user priority of the uplink frame serving to notify the AP that the station is awake need not restrict the user priority of the buffered frame transmitted in response. In general, the higher-priority frames will be transmitted before lower priority frames, unless other algorithms are adopted at the AP to account in addition to priority, the age of the buffered frame and its remaining life.

The APSD Mechanism is designed for periodic downlink traffic streams such as VoIP calls. It applies to both symmetric and non-symmetric traffic streams. The legacy power-saving rules apply when operating under APSD. In addition, a station operating in APSD mode indicates in a TSPEC request the rate at which downlink frames will be generated. The AP will schedule the time of downlink frame delivery to the station, notifying the station of this schedule in its TSPEC response. The station must wake up to receive downlink frames according to that schedule. It should be noted that APSD applies to non-symmetric periodic streams, such as audio and video.

APSD can be combined with legacy power saving in order to accommodate both periodic and non-periodic traffic. When the downlink traffic is not periodic, a station can use the legacy power management method described above. For instance, when in stand-by mode, a station would listen to the TIM beacon and send an uplink frame to receive all buffered frames. If the AP receives a frame with the Power Management bit set to 0 in the frame control field, the AP will send frames buffered for that station, regardless of whether this occurs at the scheduled wake up time. A station would not need to wake up to find out from the TIM whether there are downlink frames waiting if there is an APSD downlink stream scheduled.

In general, a power-saving station can transmit uplink transmissions at any time. There are benefits derived, however, from coordinating uplink transmission with the APSD schedule. APSD can be used with both channel access mechanisms, distributed random access (as in EDCF) and centralized polled access (as in HCF polling). If a station with an admitted APSD TSPEC uses EDCF access, it is efficient to send uplink frames at the specified APSD schedule. Otherwise, a station would have to expend additional energy for powering up at a different time to transmit. When using polled access, the AP will send a poll combined with the downlink data; both will be transmitted according to the specified schedule. In addition to the power savings during power-up mentioned above, piggybacking a poll enables uplink transmissions to occur without contention. The APSD service interval should be short enough to accommodate all downlink APSD streams. A power-saving station will be polled with an aggregate schedule for all traffic streams.

To summarize, a station will use the Legacy power saving mechanism unless there is a downlink APSD TSPEC request admitted for the station with a service interval shorter than the TIM beacon interval, in which case it employs APSD as described below.

If there is a downlink APSD TSPEC admitted for a station with a longer service interval than the TIM beacon interval, the station will engage in both the Legacy power saving mechanism and APSD as described below. Null uplink frames with the Power Management bit set to 0 in the frame control field will be sent when the station wakes to receive buffered frames, provided that it is not due to wake up shortly according to the APSD schedule.

The operation of the station and the AP under APSD is described in more detail below for each of the two access modes.

Station APSD operation
 EDCF access
  The station wakes up periodically at the TSPEC-specified schedule and sends any buffered uplink frames.
  If there is no frame to send in a cycle, the station waits to receive a downlink transmission. If a transmission is received but it is not directed to itself, the station will go to sleep. The station will stay awake for a specified time (e.g. SIFS plus the transmission time of two data frames and an ACK) and if no transmission is received, it goes to sleep.
  The station will stay awake until it has transmitted all its uplink frames and has received notice from the AP that there are no buffered frames pending immediate transmission. A downlink frame with the More Data bit set to 0 in the frame control field, signals that there are no more downlink frames pending transmission. A downlink frame with the Last bit set to 1 in the QoS control field, signals that the AP need not transmit more downlink frames during this wake-up period.
  Having received a downlink frame with either the More Data bit set to 0 or the Last bit "ON", a station shall acknowledge receipt of the frame and stay awake until it receives another transmission starting at PIFS following ACK timeout. If no such transmission occurs the station will go to sleep. If the transmission is not from the AP, or not directed to itself, the station will go to sleep. Otherwise the station will acknowledge receipt of the frame and stay awake until it receives another transmission starting at PIFS following ACK timeout.
  A station that goes to sleep having received a downlink frame with the Last bit set to 1 and the More Data bit set to 1 may send a null frame with Power Management bit set to 0 to receive the remaining buffered frames.

Polled access
  The station wakes up periodically at the TSPEC-specified schedule and waits to be polled. Uplink data is piggybacked with ACKs. After a specified time expires without receiving a poll, the station sends a frame uplink using EDCF access.
  The station will stay awake until it has transmitted its uplink frames and has received notice from the AP that there are no buffered frames pending immediate transmission. A downlink frame with the More Data bit set to 0 in the frame control field, signals that there are no more downlink frames pending transmission. A downlink frame with the Last bit set to 1 in the QoS control field, signals that the AP need not transmit more downlink frames during this wake-up period.
  Having received a downlink frame with either the More Data bit set to 0 or the Last bit set to 1, a station shall acknowledge receipt of the frame and stay awake until it receives another transmission starting at PIFS following ACK timeout. If no such transmission occurs the station can go to sleep. If the transmission is not from the AP, or not directed to itself, the station can go to sleep. Otherwise the station will acknowledge receipt of the frame and stay awake until it receives another transmission starting at PIFS following ACK timeout.
  A station that goes to sleep having received a downlink frame with the Last bit set to 1 and the More Data bit set to 1 may send a null frame with Power Management bit set to 0 to receive the remaining buffered frames.

AP APSD Operation
 EDCF Access—Active Mode
  The AP sends any buffered frames at the TSPEC-specified schedule. Downlink data is piggybacked with any pending ACKs to uplink data from the station. If there is no frame to send in a cycle, it sends nothing.
  Receipt of a frame with the Power Management bit set to 1 in the frame control field indicates that the station sending the frame is going to sleep mode. The AP buffers the frames destined to a station in power saving mode. The More Data bit in the frame control field is set to 1 for all buffered frames except the last, in which the same is set to 0.
  The Last bit in the QoS control field is set to 0 for all downlink frames sent to a station until the AP determines that other downlink transmissions have precedence, in which case the AP sends downlink frames with the Last bit "ON". Once a frame has been sent to a station with the Last bit "ON", the AP may send additional frames to the same station, provided the station remains awake. If the AP that receives an uplink frame from a station for which it has no buffered data, it will set the More Data bit to 0 in the ACK sent to that station.

Polled access—Active mode
  The AP polls station starting at the TSPEC-specified schedule. Downlink data is piggybacked with polls to the station and ACKs to uplink data. Polling continues as indicated by the More Data bit (or the queue size) in the poll response. Receipt of a frame with the Power Management bit set to 1 in the frame control field indicates that the station sending the frame is going to sleep mode. The AP buffers the frames destined to a station in power saving mode. The More Data bit in the frame control field is set to 1 for all buffered frames except the last, in which the same is set to 0.
  The Last bit in the QoS control field is set to 0 for all downlink frames sent to a station until the AP determines that other downlink transmissions have precedence, in which case the AP sends downlink frames with the Last bit set to 1. Once a frame has been sent to a station with the Last bit set to 1, the AP may not send additional frames to the same station until the next scheduled poll. If the AP has no buffered data, it will set the More Data bit to 0 in the poll sent to that station.

QoS Prioritization under APSD
 As in the case of Legacy power saving, QoS requirements are best served when the AP is free to send downlink frames as soon as possible, or according to the criteria employed in a scheduling algorithm. In general, the higher-priority frames will be transmitted before lower priority frames, unless other algorithms are adopted at the AP to account, in addition to priority, the age of the buffered frame and its remaining life. That means that downlink transmission of frames buffered at the AP should be allowed to occur when the station wakes up, regardless of what causes the station to wake up. That is, regardless of whether the station follows the APSD schedule, or sends uplink frames with the Power Management bit set to 0 in the frame control field.
 Buffers at the AP are emptied when the station is off the power saving mode. Using the PIFS access rule (the AP accesses the channel if it has been idle for a time interval of duration PIFS) for all or just the highest priority traffic, the higher priority queues are typically emptied first, followed by the lower priority. Downlink transmission to a station that is awake may stop before the buffers are all empty if the AP has higher priority traffic pending for other stations. The last bit will be used to notify a station that no more downlink frames will be sent while it is still awake, and it may thus go sleep. A station that goes to sleep having received a downlink frame with the Last bit set to 1 and the More Data bit set to 1 may subsequently send a null frame with Power Management bit set to 0 using EDCF access in order to receive the remaining buffered frames.
 A comparison of 'Legacy' and APSD will now be discussed. Advance knowledge of the station wake-up schedule in APSD enables the station to wake up when the AP is ready to transmit downlink frames. It is not necessary to be prompted by the station with uplink frames notifying that it is awake. Hence, APSD is efficient for both symmetric (e.g. voice) and asymmetric (e.g. video) periodic streams. APSD, when used with either EDCF or polled access, increases channel utilization efficiency because the station need not stay awake waiting for the AP to complete other transmissions and TXOPs before sending buffered data to the power-saving station. Doing otherwise would cause battery drain, delay and jitter. HCF polling combined with APSD gives even better results in terms of battery life. Piggybacking data with a poll or an acknowledgement reduces channel overhead. Polling further eliminates power consumption as the station avoids contention for the channel to send its uplink frame.

Although the illustrative embodiment of the present invention is disclosed in the context of IEEE 802.11 local-area networks, it will be clear to those skilled in the art after reading this specification how to make and use embodiments of the present invention for other kinds of networks and network protocols.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A method of saving power in a wireless Local Area Network (WLAN) including an Access Point (AP) and at least one station, the method comprising:
   receiving, at an AP, a Power Save (PS) Poll from a station;
   retrieving a frame from a highest priority buffer having frames for said station;
   receiving a frame control field of a frame transmitted uplink to the AP, the frame control field having a Power Management (PM) bit reset, wherein after said frame having a PM bit reset is received, said AP fills a transmit buffer with copies of frames ordered by priority;
   transmitting frames from said transmit buffer to said station in accordance with an order of priority; and
   removing said frames from said transmit buffer as the copies of frames are transmitted, wherein said removing is done when the PM bit for said station is set in a frame control field of a frame transmitted uplink to the AP;
   transmitting fewer than all frames in the transmit buffer to the station during a period in which the station is awake; and
   while there is still at least a portion of traffic buffered in the transmit buffer at the access point for transmission to the station, transmitting an end-of-wake period indication to the station to notify the station that the station can go to sleep.

2. The method as in claim 1 further comprising:
   receiving a request from the station, the request including a temporal period for a subsequent wake-up schedule to receive frames;
   analyzing existing transmission schedules to determine, for the temporal period, a temporal offset that will reduce concurrent wakeups by the station; and
   sending a notification to the station that the request has been granted, the notification to the station including the temporal offset for the temporal period.

3. The method as in claim 2, wherein analyzing includes:
   determining that a shared-communications channel can handle an additional load associated with the temporal period without a rate of collisions exceeding a threshold value.

4. The method as in claim 2, wherein the station wakes up to communicate with the access point in accordance with the temporal period and temporal offset.

5. The method as in claim 1 further comprising:
   subsequent to transmitting the frames from the transmit buffer, sending a notification to the station indicating that the transmit buffer is empty; and
   receiving, on an upload channel, frames at the access point from the station.

6. The method as in claim 1 further comprising:
   subsequent to transmitting the frames from the transmit buffer, sending a notification to the station indicating that the access point will not send any more frames to the station during a current wake-up period in which the station received the frames from the access point.

7. The method as in claim 1 further comprising:
   in response to detecting higher priority data traffic than frames in the transmit buffer:
      providing notification to the station that the station can go to sleep because no more frames will be sent from the access point to the station; and
      discontinuing transmission of the frames in the transmit buffer to the station and transmitting the higher priority traffic from the access point to another station.

8. The method as in claim 1 further comprising:
   in response to detecting higher priority data traffic than frames in the transmit buffer:
      providing notification to the station that the station can go to sleep because no more frames will be sent to the station; and
      discontinuing transmission of the frames in the transmit buffer to the station and transmitting the higher priority traffic from the access point to another station.

9. A method of saving power in a wireless Local Area Network (WLAN) including an Access Point (AP) and at least one station, the method comprising:
   determining a length of an awake period of a station wherein said station permits additional frames to be sent from said AP to said station when said station sends a frame to said AP, said frame having a Power Mode (PM) bit set and wherein said AP stops sending frames to said station when said station sends a frame having said PM bit set, wherein after said frame having a PM bit reset is received, said AP fills a transmit buffer with copies of frames ordered by priority, transmitting frames from said transmit buffer to said station in order of priority; and removing said copies of frames from said transmit buffer in response to transmitting copies of said frames in transmit buffer to the station, wherein said removing is done when the PM bit for said station is set in a frame control field of a frame transmitted uplink to the AP;
   subsequent to the station acquiring an upload channel to communicate with the access point, receiving upload frames from the station at the access point;
   wherein the upload frames received on the upload channel are interleaved with frames downloaded on a download channel from the access point to the station, the method further comprising:
      subsequent to transmitting the frames from the transmit buffer to the station, sending a notification to the station indicating that the transmit buffer is empty; and
      receiving frames at the access point from the station on an upload channel.

10. The method of claim 9 wherein a transfer of frames between said AP and said station is performed in accordance with a state of APSD and said PM bit wherein when said APSD is set and said PM is set then downlink frames are buffered, and a frame may be transmitted to the station only at a specified time.

11. The method of claim 9 wherein a transfer of frames between said AP and said station is performed in accordance with a state of APSD and said PM bit, wherein when said APSD is set and said PM is set then downlink frames are buffered, and frames may be transmitted to the station at a specified time until the AP decides when to stop.

12. The method of claim 9 wherein a transfer of frames between said AP and said station is performed in accordance with a state of APSD and said PM bit wherein when said APSD is reset and said PM is set, and the AP may not transmit frames to the station until said AP receives one of a PS poll and when said PM bit changes value.

13. The method of claim 9 wherein a transfer of frames between said AP and said station is performed in accordance with a state of APSD and said PM bit, wherein when said APSD is reset and said PM is set, then downlink frames may be sent to the station.

14. The method of claim 9 wherein said frames are sent using polled access.

15. The method as in claim 9 further comprising:
receiving a request from the station, the request including a temporal period for a subsequent wake-up schedule to receive frames;
analyzing existing transmission schedules to determine a temporal offset for the temporal period that will reduce concurrent wakeups by the station; and
sending a notification to the station that the request has been granted, the notification to the station including the temporal offset for the temporal period; and
while there is still traffic buffered in the traffic buffer for transmitting to the station, transmitting an end-of-wake period indication from the access point to the station to notify the station that the station can go back to a sleep mode.

16. The method as in claim 15, wherein analyzing includes:
determining that a shared-communications channel can handle an additional load associated with the temporal period without a rate of collisions exceeding a threshold value, the method further comprising:
transmitting fewer than all frames in the transmit buffer to the station during a period in which the station is awake; and
while there is still at least a portion of traffic buffered in the transmit buffer at the access point for transmission to the station, transmitting an end-of-wake period indication to the station to notify the station that the station can go to sleep.

17. A method of saving power in a wireless Local Area Network (WLAN) including an Access Point (AP) and at least one station, the method comprising:
receiving, at an AP, a Power Save (PS) Poll from a station;
retrieving a frame from a highest priority buffer having frames for said station;
receiving a frame control field of a frame transmitted uplink to the AP, the frame control field having a Power Management (PM) bit reset, wherein after said frame having a PM bit reset is received, said AP fills a transmit buffer with copies of frames ordered by priority;
transmitting frames from said transmit buffer to said station in accordance with an order of priority; and
removing said frames from said transmit buffer as the copies of frames are transmitted, wherein said removing is done when the PM bit for said station is set in a frame control field of a frame transmitted uplink to the AP
subsequent to the station acquiring an upload channel to communicate with the access point, receiving upload frames from the station at the access point; and
wherein the upload frames received on the upload channel are interleaved with frames downloaded on a download channel from the access point to the station.

* * * * *